No. 831,557. PATENTED SEPT. 25, 1906.
W. KUMPF.
MOUSE TRAP.
APPLICATION FILED JULY 3, 1906.
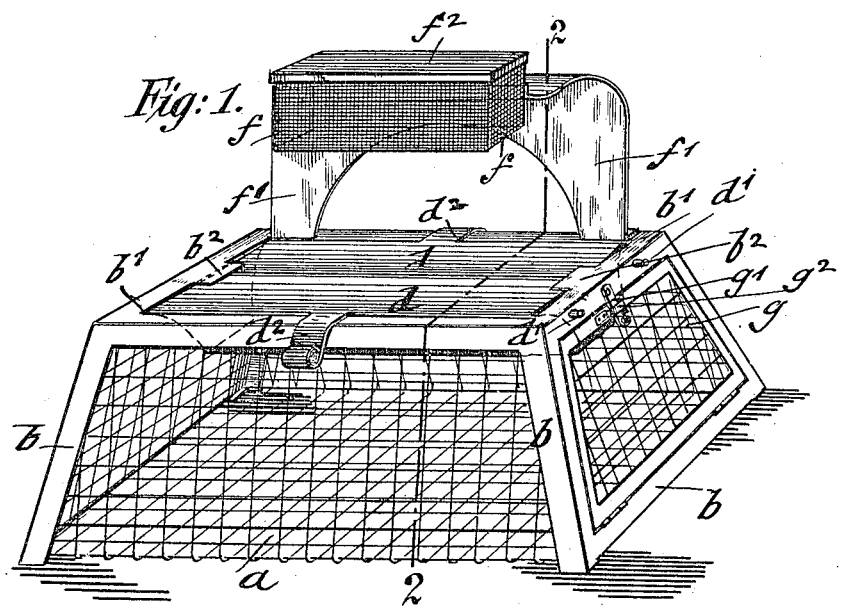
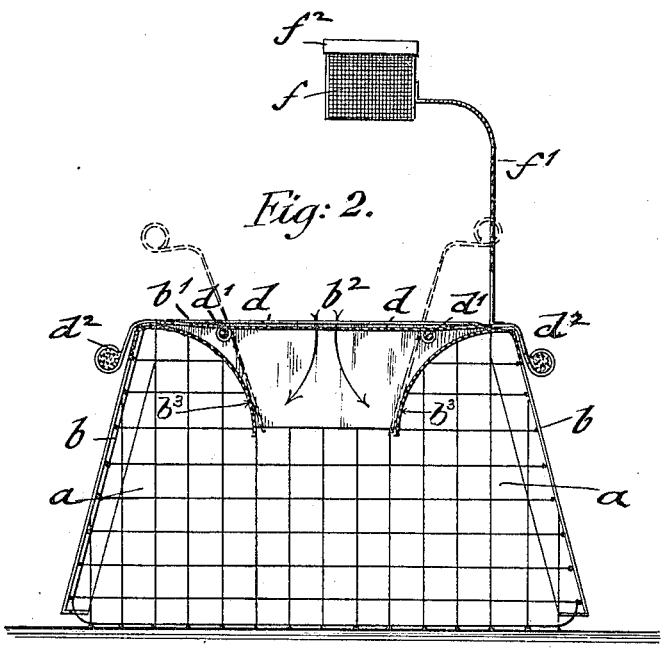
Witnesses
H. Schneider.
H. P. Buhrter.
Inventor
William Kumpf
By his Attorneys
James Loeper

UNITED STATES PATENT OFFICE.

WILLIAM KUMPF, OF NEW YORK, N. Y.

MOUSE-TRAP.

No. 831,557.     Specification of Letters Patent.     Patented Sept. 25, 1906.

Application filed July 3, 1906. Serial No. 324,565.

*To all whom it may concern:*

Be it known that I, WILLIAM KUMPF, a citizen of the United States, residing in New York, in the borough of Manhattan, county and State of New York, have invented certain new and useful Improvements in Mouse-Traps, of which the following is a specification.

This invention relates to certain improvements in mouse-traps by which a number of mice can be caught in the trap without replacing the bait; and the invention consists in the novel features of construction, which will be fully described hereinafter and finally pointed out in the claim.

In the accompanying drawings, Figure 1 represents a perspective view of my improved mouse-trap; and Fig. 2 is a vertical transverse section of the same on line 2 2, Fig. 1.

Similar letters of reference indicate corresponding parts in the two figures of the drawings.

Referring to the drawings, $a$ represents a hollow box or receptacle which is made of comparatively wide-meshed wire-netting, the bottom, together with front, side, and rear walls, being preferably made up from one piece of wire-netting. The front, side, and rear walls are made inclined toward the bottom and reinforced at the side corners by angularly-bent sheet-metal strips $b$ and at the upper corners by a top frame $b'$, which is provided at its sides with central inwardly-projecting lugs $b^2$ and along its front and rear edges with downwardly-bent plates $b^3$. The lugs $b^2$ and plates $b^3$ serve as stops for two trap-doors $d$, which are pivoted, by means of pivot-pins $d'$, to the top frame and which are held in closed position by outwardly-extending weighted arms $d^2$, that extend over the front and rear portions of the top frame, as shown clearly in Figs. 1 and 2. The plates $b^3$ converge downwardly and form between them the mouth of the trap. Each lug $b^2$ serves as a stop for both trap-doors, contacting with the same at their inner edges, as shown. The inner ends of the trap-doors come close together, but without abutting against each other, so that each trap-door can be tilted independently of the other by the slightest pressure exerted thereon. Above the trap-doors $d$ is supported a bait-receptacle $f$, which is supported on an upright standard $f'$, which is attached to the rear part of the hollow box $a$. The bait-receptacle $f$ is closed by a detachable cover $f^2$, so that the bait which is placed in the same may be used for a considerable length of time. To one end of the box is applied a hinged door $g$, formed of an exterior frame and wire-netting, said door being held in closed position by means of a latch $g'$ or other locking device which is pivoted to the side of the top frame and which engages a keeper $g^2$ on the upper part of the hinged door $g$, as shown clearly in Fig. 1.

When the bait is placed in position for use, the mice try to get to the bait and in doing so step on the trap-doors and are dropped into the interior of the hollow wire box $a$. As the trap-doors are returned into closed position by their weighted arms, as soon as the pressure thereon is released they are tilted back into their normal position, so as to be ready for the next mouse, and so on. When a number of mice are caught in the trap, they are drowned by placing the trap under water, the bodies being then removed by opening the end door, after which the door is closed again, the trap thereby being ready again for use.

The trap can be made in several sizes, so as to be also used for catching rats and other animals.

The trap has the advantage of setting itself without renewing the bait and of catching thereby a number of mice before they are killed and removed.

Having thus described my invention, I claim as new and desire to secure by Letters Patent—

A mouse-trap comprising a hollow box open at the top, a frame conforming to the upper edge of said box and having downwardly and inwardly bent plates formed integral therewith and converging downwardly, said plates forming between them the mouth of the trap, lugs formed on said frame at the sides thereof and projecting inwardly toward each other, trap-doors pivoted in the sides of said frames and limited in their movement by said lugs and said downwardly-bent plates, each lug acting as a stop for both trap-doors, counterweighted arms carried by said doors, and a bait-receptacle supported above said doors.

In testimony that I claim the foregoing as my invention I have signed my name in presence of two subscribing witnesses.

WILLIAM KUMPF.

Witnesses:
    PAUL GOEPEL,
    HENRY J. SUHRBIER.